No. 865,050. PATENTED SEPT. 3, 1907.
C. H. MARSTON & H. H. CUMMINGS.
APPARATUS FOR MARKING CHECKS.
APPLICATION FILED JUNE 7, 1907.
3 SHEETS—SHEET 1.
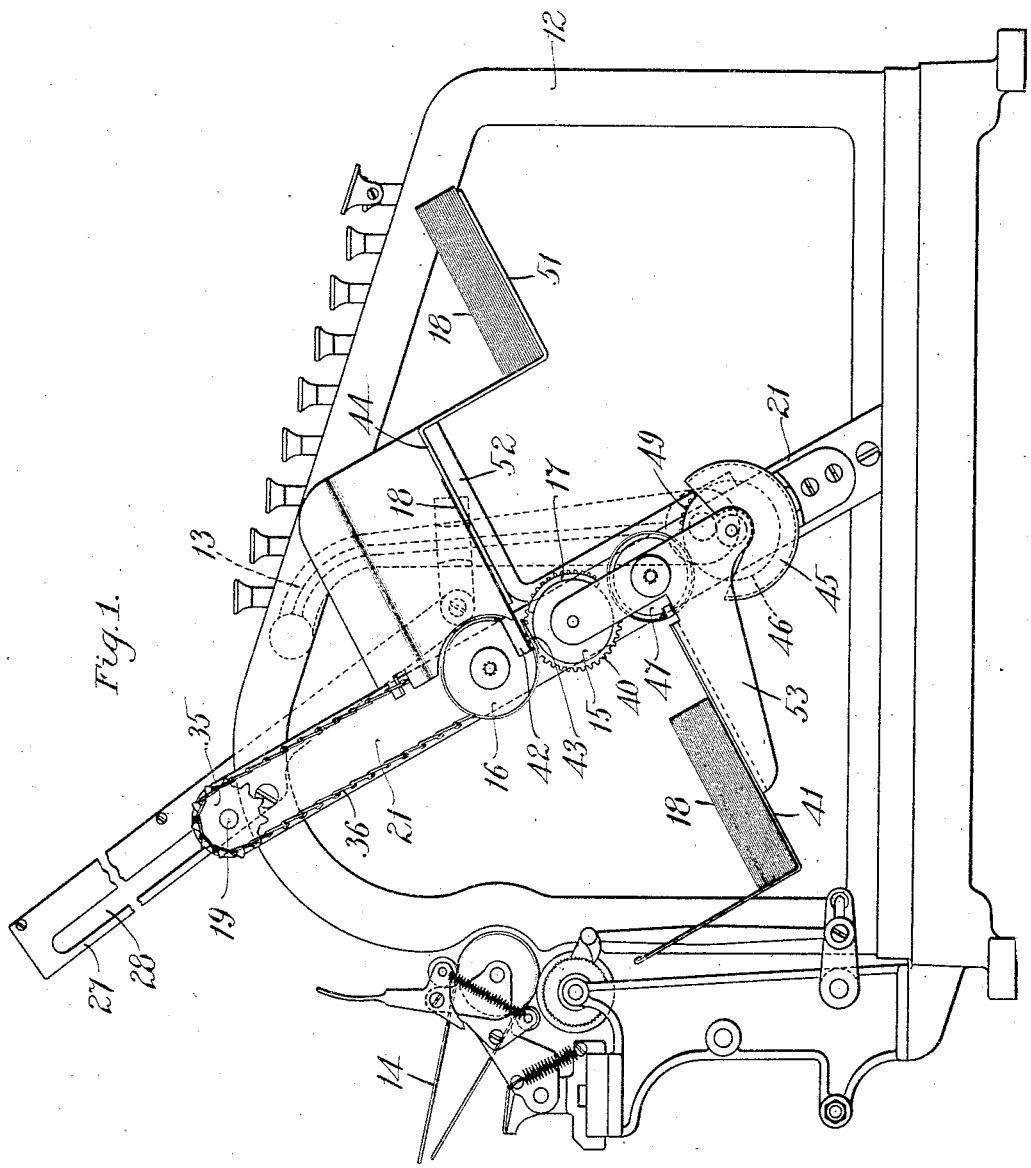
Witnesses.
P. W. Pizzetti
E. Batchelder
Inventors.
C. H. Marston
H. H. Cummings

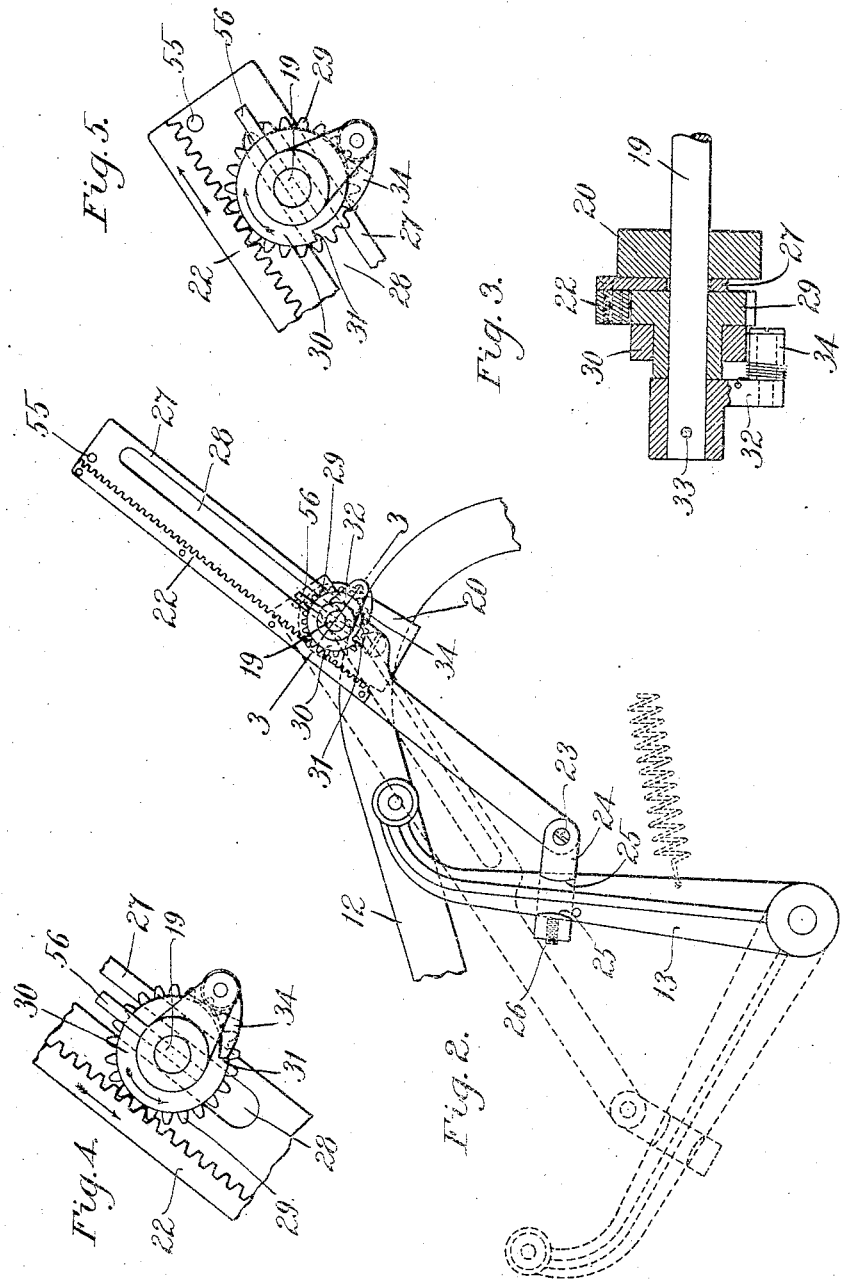

No. 865,050. PATENTED SEPT. 3, 1907.
C. H. MARSTON & H. H. CUMMINGS.
APPARATUS FOR MARKING CHECKS.
APPLICATION FILED JUNE 7, 1907.
3 SHEETS—SHEET 3.
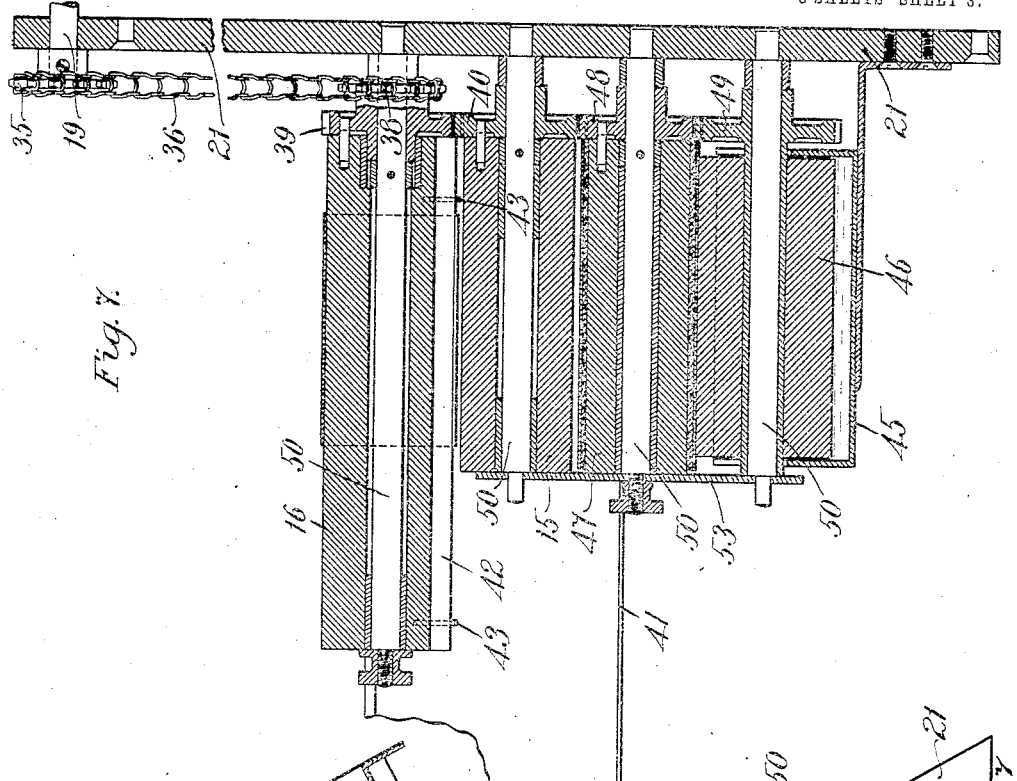
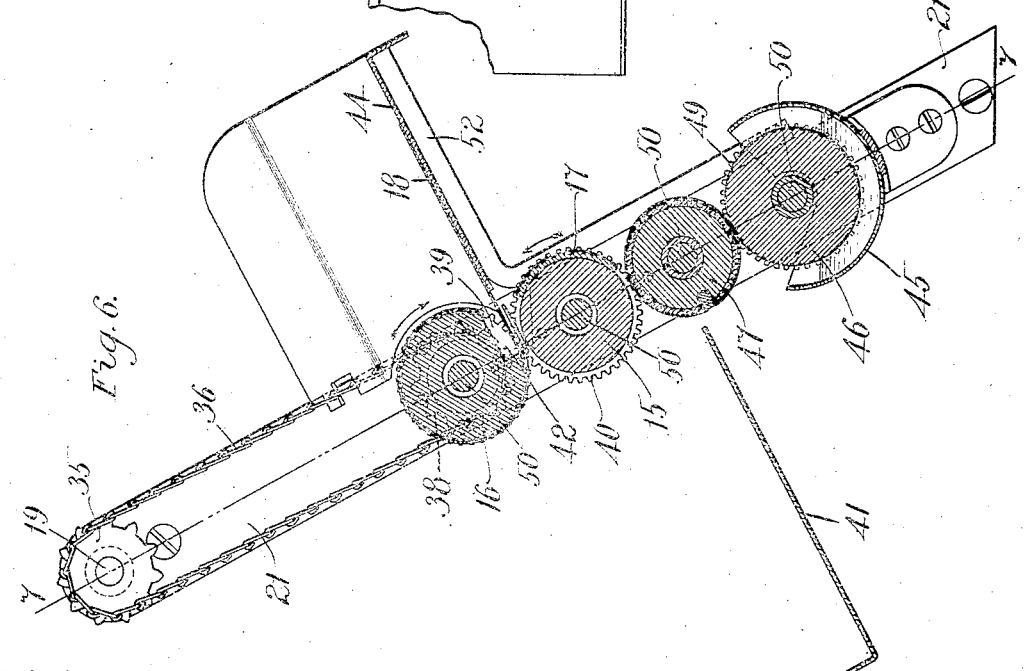
Witnesses.
Inventors
C. H. Marston
H. H. Cummings

UNITED STATES PATENT OFFICE.

CHARLES H. MARSTON, OF READING, AND HENRY H. CUMMINGS, OF NEWTON, MASSACHUSETTS; SAID CUMMINGS ASSIGNOR TO SAID MARSTON.

APPARATUS FOR MARKING CHECKS.

No. 865,050.

Specification of Letters Patent.

Patented Sept. 3, 1907.

Application filed June 7, 1907. Serial No. 377,743.

*To all whom it may concern:*

Be it known that we, CHARLES H. MARSTON, of Reading, in the county of Middlesex and State of Massachusetts, and HENRY H. CUMMINGS, of Newton, in the county of Middlesex and State of Massachusetts, have invented certain new and useful Improvements in Apparatus for Marking Checks, of which the following is a specification.

This invention has for its object to provide means for imprinting on the backs of bank checks the usual printed information which is placed on the check after its reception in the bank where it is payable, the printed information being usually applied by a rubber printing member, and giving the name of the bank, the name of its cashier or other officer, the date, etc.

The information above referred to, for the sake of convenience, will be hereinafter called the printed indorsement. It is the usual practice to apply the printed indorsement to the checks by a hand operated rubber stamp. It is also customary in banks of any considerable size, to employ an adding machine which is caused to print on a record sheet the amounts represented by the checks handled during a given period, the adding machine being provided with keys which set the printing characters of the machine, and with an oscillatory lever which is manually moved in one direction by the operator, and is automatically moved by a spring or otherwise in the opposite direction when the operator releases it. The operator facing the machine, takes up the checks one by one, holding each check in one hand while manipulating the keys of the adding machine to adapt the machine to print the amount represented by the check. After the machine has been set to print the amount of one check, the operator moves the lever forward, and thus causes an impression by the printing mechanism of the amount of the check on the record sheet. When the operator releases the lever, it is automatically returned to its starting position, and the record sheet is at the same time fed along. This operation is repeated for each check. Usually the operator of the adding machine does nothing but manipulate the adding machine in the manner described, to record the amounts of the checks on the record sheet, the printed indorsements being applied to the checks by an operation performed for this purpose alone, and at a different time.

Our invention has for its object to enable the printed indorsements to be applied to the checks at the same time that the adding machine is being operated to record the amounts of the checks, thus saving the delay and loss of time involved when a separate operation apart from the adding machine is required for affixing the printed indorsements.

It has been proposed heretofore to combine with an adding machine of the character above indicated, a stamping mechanism, which comprises a reciprocating stamp adapted to be moved toward and from a pile of checks, and to stamp the top check in the pile, the said reciprocating stamp being connected with the lever of the adding machine in such manner that the forward movement of the lever by the operator causes the stamp to make an impression on the top check of the pile, the backward movement of the lever causing the return or retraction of the stamp to its starting position.

Our invention is embodied in a check marking apparatus in which a printing couple is employed, instead of a reciprocating stamp, so that the printed indorsements are impressed upon the checks simply by the passage of the checks between the members of the printing couple, said members being rotated during one movement of the operating lever, and remaining at rest during the opposite movement, so that no reciprocating movement of any part of the printing mechanism is required, while the power required to operate the printing mechanism is reduced to the minimum, and the printing operation is in general more advantageously performed than heretofore.

The invention also has for its object to provide an attachment adapted to be readily and conveniently applied to an adding machine of the character above indicated, without any substantial adaptation of the machine to the attachment, the attachment being supported wholly by the casing of the machine.

The invention consists in the improvements which we will now proceed to describe and claim.

Of the accompanying drawings, forming a part of this specification,—Figure 1 represents an end elevation of an adding machine provided with a check printing attachment embodying our invention. Fig. 2 represents an elevation of portions of the opposite end of the machine from that shown in Fig. 1, and corresponding portions of the attachment embodying our invention. Fig. 3 represents a section on line 3—3 of Fig. 2. Figs. 4 and 5 represent fragmentary views showing portions of the construction represented by Fig. 2 under different conditions. Fig. 6 represents a transverse section of the printing couple and the inking mechanism used in connection therewith, together with an elevation of parts of the printing attachment. Fig. 7 represents a section on line 7—7 of Fig. 6.

The same letters of reference indicate the same parts in all the figures.

In the drawings 12 represents the casing of an adding machine which may be of any suitable form, the form here shown being that of the Burroughs adding machine.

13 represents the oscillatory operating lever of the machine, said lever being normally held by a spring or otherwise, as usual, in the position shown in full lines in Fig. 2, and adapted to be manually moved by the operator to the position shown by dotted lines, the movement of the lever to the last-mentioned position causing the printing characters of the machine to make an impression on the record sheet 14 at the back of the machine. When the lever is released, after being pulled forward by the operator, it is returned by its controlling spring to its normal position.

In carrying out our invention we mount upon the casing of the machine, a printing couple composed of an impression member or roll 15, and a bed member or roll 16, these members being of cylindrical form, and geared together to form a couple of rotation. The impression member 15 is provided with a segmental printing form or plate 17, which may be of elastic material, and adapted to impress the printed indorsement upon the under surface of a check 18 passed between the two members. The printing couple is located at the end of the machine opposite the end at which the operating lever 13 is located. Intermediate mechanism is employed, which is organized to impart rotation to the members of the printing couple during one of the above described movements of the operating lever, and to allow the members of the printing couple to stand at rest during the opposite movement of the operating lever. In the embodiment of our invention here shown, the said intermediate mechanism causes the rotation of the printing couple during the forward movement of the lever caused by the operator, the couple being at rest during the return movement of the lever caused by the retracting spring. The best organization of the said intermediate mechanism at present known to us will be next described.

19 represents a shaft which extends across the machine from end to end, one end portion of the shaft being journaled in a bearing formed in a bearing plate or member 20, which is attached by screws or otherwise to the end of the casing 12 adjacent to the operating lever. The opposite end portion of the shaft 19 is journaled in a bearing plate or member 21, affixed by screws or otherwise to the opposite end portion of the casing 12.

22 represents a rack bar pivoted at 23 to an ear 24 which is affixed to the operating lever 13, said ear being preferably adapted to be detachably secured to the lever, the ears being shown in Fig. 2 as provided with a recess, the ends 25 of which bearing on opposite edges of the lever, and a set screw 26 which engages the lever. The rack bar 22 is provided with a guide flange 27, having a slot 28 through which the shaft 19 passes.

29 represents a small gear or pinion mounted to rotate loosely on the shaft 19, and meshing with the rack 22. To the pinion 29 is affixed a collar 30 having a ratchet tooth or clutch member 31.

32 represents an arm having a hub which is rigidly attached by a pin 33 to the shaft 19. To the arm 32 is pivotally connected a dog or complemental clutch member 34 adapted to engage the clutch member 31 when the pinion 29 is rotated in the direction indicated by the arrow in Fig. 4, thus causing the rotation of the shaft 19. When the pinion is rotated in the opposite direction, as indicated in Fig. 5, the clutch member 31 slips by the complemental member 34 without engaging it.

It will be seen from the foregoing that when the operating lever 13 is moved from the position shown in full lines to the position shown in dotted lines in Fig. 2, the rack bar 22 is moved in the direction indicated in Fig. 4, and causes the rotation of the pinion 29 in the direction required to engage the two clutch members 31 and 34, and rotate the shaft 19, the rotation of the shaft being imparted to the printing couple, as hereinafter described. When the operating lever is returned to the position shown in full lines, the rack bar moves in the direction indicated in Fig. 5, causing a reversal of the movement of the clutch member 31 so that it does not engage the member 34, the shaft 19 therefore remaining at rest.

35 represents a sprocket wheel attached to the end of the shaft 19 nearest the printing couple. A sprocket chain 36 connects the wheel 35 with a similar sprocket wheel 38 affixed to the member 16 of the printing couple. The motion imparted to the shaft 19, as above described, is transmitted through the said sprocket wheels and chain to the member 16 of the printing couple, and from the latter to the member 15 by gears 39 and 40 which connect the said members. The printing couple is therefore rotated during each forward movement of the operating lever, the rotation of said members being in the direction indicated by the arrows in Fig. 6, so that a check presented to the nip of the members of the printing couple, will be fed between said members by their rotation, and delivered at the back side of the printing couple, where a receptacle 41 is provided for the reception of the printed checks. The printing couple remains at rest during the return movement of the operating lever. The mechanism which transmits motion from the operating lever to the printing couple is so timed that the members of the couple come to rest in the exact position required for the proper reception of the next check to be printed.

The impression member 16 of the printing couple is provided with a longitudinal recess 42 in its periphery, one side of said recess forming a stop or projection for the advancing edge of the check presented to the couple.

43 43 are arms which project from the back side of the recess 42 partly across the same in position to support the forward edge of the check presented to the printing couple.

44 represents an inclined table, which is so arranged relatively to the printing couple as to guide a check to the nip of the rolls forming said couple.

When the machine is at rest and the operating lever in its normal position, the members of the printing couple are in the position shown in Fig. 6, the recess 42 and arms 43 being in position to arrest and support the advancing edge of a check which is placed upon the table 44. When the members of the printing couple are rotated, they grasp the check, and feed it along while printing it, the check being deposited in the receptacle 41.

45 represents an ink reservoir supported by the bearing member 21.

46 represents an ink-raising roll, which rotates in the reservoir, and is preferably composed of a metal body having a smoothly polished periphery, so that it will take up only a thin film of ink from the reservoir.

49 represents an intermediate inking roll located between the roll 46 and the impression roll or member 15 of the printing couple, the intermediate roll 47 having a yielding periphery, and being adapted to transfer ink from the roll 46 to the impression plate 17 of the printing couple. To the rolls 47 and 46 are affixed intermeshing gears 48 and 49, the gear 48 meshing with the gear 40 on the member 15 of the printing couple. The bearing member 21 is provided with a plurality of studs 50, on which the rolls composing the printing couple and inking mechanism are mounted to rotate, the gears 39, 40, 48 and 49, which form the train causing the rotation of said rolls, being attached to the rolls, and mounted on said studs, as shown in Fig. 7. A receptacle 51, adapted to hold a pile of checks, is supported by a bracket 52 at the front side of the printing couple, said bracket being affixed to the bearing member 21. The checks in the holder 51 are in convenient position to be picked up one by one by the operator, and deposited on the table 44 after being listed. The check holder 44 at the back side of the printing couple is here shown as supported by a bracket 53, which is mounted on three of the studs 50, as shown in Figs. 1 and 7. The holder 41 is therefore supported by the bearing member 21 through the said studs.

It will be seen that the attachment may be applied to an adding machine by screwing the bearing members 20 and 21 to the ends of the casing, and clamping the ear 24 to the operating lever, an operation which is very simple, and requires but a slight adaptation of the casing by forming screw holes therein. It is obvious, however, that when the printing mechanism is applied to new machines, the bearing members 20 and 21 may be integral parts of the casing of the machine.

To insure the arrest of the members of the printing couple in the position shown in Fig. 6, which is the correct position for receiving a check, I provide the flange 27 of the rack bar 22 with a stop member or pin 55, and the shaft 19 with a stop member 56, which may be a prolongation of the pin 33 shown in Fig. 3. Said stop members are so arranged that when the rack bar reaches its extreme forward position, as shown by dotted lines in Fig. 2, the stop member 55 will be in the path of the stop member 56, and arrest the same, thus stopping the rotation of the shaft 19, with the members of the printing couple in the position shown in Fig. 6.

I claim:

1. In combination, an adding machine having an external movable part, a printing couple, and intermediate mechanism for imparting rotary motion from said movable part to the members of the printing couple.

2. In combination, an adding machine having an oscillatory operating lever, a printing couple, and intermediate mechanism for imparting rotary motion from the said lever to the members of the printing couple.

3. In combination, an adding machine having an oscillatory operating lever, a printing couple, and intermediate connections between the lever and the printing couple, comprising a shaft, and means for imparting rotary motion to said shaft from the lever during one of the movements of the lever, said means being inoperative during the opposite movement of the lever.

4. In combination, an adding machine having an oscillatory operating lever, a printing couple, and intermediate connections between the lever and the printing couple, comprising a shaft located above the printing couple, means for imparting rotary motion to the shaft from the lever during one of the movements of the lever only, and means for imparting rotary motion from the shaft to the printing couple.

5. In combination, an adding machine having an oscillatory operating lever, a printing couple, a shaft engaged with the printing couple, and connections between the shaft and the lever whereby the shaft is rotated only during one of the movements of the lever, said connections comprising a rack bar hinged to the lever, a pinion meshing with the rack and mounted to rotate loosely on the shaft, said pinion carrying a clutch member, and a complemental clutch member carried by the shaft, and adapted to engage the first mentioned clutch member during a movement of the pinion in one direction.

6. In combination, an adding machine having an oscillatory operating lever located at one end of the machine casing, printing mechanism supported by the casing, and located at the opposite end thereof, a shaft journaled in bearings on the casing and extending across the same, connections between the shaft and lever, and connections between the shaft and the printing mechanism.

7. In combination, an adding machine having an oscillatory operating lever located at one end of the machine casing, a printing couple supported by the casing and located at the opposite end thereof, means for imparting motion from the lever to the printing couple, and a table for guiding a check to the nip of the members of the couple, one of said members having a longitudinal recess in its periphery, forming a check stop, and check-supporting arms projecting partly across said recess.

8. A check printing attachment adapted for engagement with the casing and operating lever of an adding machine, and comprising bearing members adapted to be attached to said casing, a printing couple carried by one of said bearing members, a shaft journaled in the bearing members, connections between the shaft and the printing couple, and means for connecting the shaft with the operating lever.

9. A check printing attachment adapted for engagement with the casing and operating lever of an adding machine, and comprising bearing members adapted to be attached to said casing, a printing couple comprising a bed roll and an impression roll rotatively mounted on one of said bearing members, inking rolls mounted on the last-mentioned bearing member and adapted to ink the printing face of the impression roll, a train of gearing connecting said rolls, a shaft journaled in the bearing members, connections between the shaft and the said train, and means for connecting the shaft with the operating lever.

10. A check printing attachment adapted for engagement with the casing and operating lever of an adding machine, and comprising bearing members adapted to be attached to said casing, a printing couple carried by one of said bearing members, a shaft journaled in the bearing members, connections between the shaft and the printing couple, means for connecting the shaft with the operating lever, and two check receptacles supported by the bearing member which carries the printing couple, one of said receptacles being at the front and the other at the rear of the printing couple.

11. In combination, an adding machine having an oscillatory operating lever, a printing couple supported by the casing of the machine, a shaft journaled in bearings on the casing and connected with the printing couple, connections between the shaft and the operating lever whereby the shaft and printing couple are rotated during a forward movement of the lever, and are left at rest during the return movement of the lever, said connections including a bar pivoted to the operating lever and movable longitudinally thereby, and stop members carried by the shaft, and by the bar, and adapted to arrest the shaft when the members of the printing couple reach a predetermined position.

In testimony whereof we have affixed our signatures, in presence of two witnesses.

CHARLES H. MARSTON.
HENRY H. CUMMINGS.

Witnesses:
C. F. BROWN,
E. BATCHELDER.